United States Patent
Liu et al.

(10) Patent No.: US 12,318,825 B2
(45) Date of Patent: Jun. 3, 2025

(54) SOIL REMEDIATION SYSTEM AND SOIL REMEDIATION METHOD

(71) Applicant: BCEG ENVIRONMENT REMEDIATION CO., LTD, Beijing (CN)

(72) Inventors: Peng Liu, Beijing (CN); Yunxiao Wei, Beijing (CN); Shupeng Li, Beijing (CN); Jiexi Zhang, Beijing (CN); Yilan Xing, Beijing (CN); Dixiang Wang, Beijing (CN); Lin Xie, Beijing (CN); Bo Li, Beijing (CN); Lina Wang, Beijing (CN)

(73) Assignee: BCEG ENVIRONMENT REMEDIATION CO., LTD, Beijing (CN)

( * ) Notice: Subject to any disclaimer, the term of this patent is extended or adjusted under 35 U.S.C. 154(b) by 0 days.

(21) Appl. No.: 18/725,796

(22) PCT Filed: Dec. 31, 2021

(86) PCT No.: PCT/CN2021/143864
§ 371 (c)(1),
(2) Date: Jul. 10, 2024

(87) PCT Pub. No.: WO2023/123426
PCT Pub. Date: Jul. 6, 2023

(65) Prior Publication Data
US 2025/0100034 A1    Mar. 27, 2025

(51) Int. Cl.
*B09C 1/00*    (2006.01)
*B09C 1/06*    (2006.01)
*B09C 1/08*    (2006.01)

(52) U.S. Cl.
CPC .................. *B09C 1/08* (2013.01); *B09C 1/06* (2013.01); *B09C 2101/00* (2013.01)

(58) Field of Classification Search
CPC .......... B09C 2101/00; B09C 1/08; B09C 1/06
See application file for complete search history.

(56) References Cited

U.S. PATENT DOCUMENTS 5,986,159 A * 11/1999 Aines ........................ B09C 1/06
                                                                    134/2
9,309,756 B1 * 4/2016 Affholter ............ E21B 43/2408
(Continued)

FOREIGN PATENT DOCUMENTS

| CN | 105665433 A | 6/2016 |
|----|-------------|--------|
| CN | 107350278 A | 11/2017 |

(Continued)

OTHER PUBLICATIONS

International Search Report and Written Opinion of the International Searching Authority dated Apr. 7, 2022 as received in Application No. PCT/CN2021/143864.
(Continued)

*Primary Examiner* — Carib A Oquendo
(74) *Attorney, Agent, or Firm* — Maschoff Brennan

(57) ABSTRACT

A soil remediation system and a soil remediation method. The soil remediation system comprises a heating unit (5) and a pumping/injecting device for pumping underground water in soil and injecting a remediation agent into the soil. The soil remediation method comprises the following treatments: heating soil to be remediated; pumping underground water; and injecting a remediation agent.

12 Claims, 6 Drawing Sheets

(56) References Cited

U.S. PATENT DOCUMENTS

| | | | |
|---|---|---|---|
| 10,787,865 B2 | 9/2020 | Li et al. | |
| 2003/0155111 A1* | 8/2003 | Vinegar | E21B 36/04 |
| | | | 166/59 |
| 2004/0120771 A1* | 6/2004 | Vinegar | B01D 53/002 |
| | | | 405/128.4 |
| 2015/0078828 A1* | 3/2015 | Brady | B09C 1/06 |
| | | | 405/128.85 |
| 2019/0145190 A1* | 5/2019 | Li | C02F 1/686 |
| | | | 405/128.45 |
| 2019/0224729 A1* | 7/2019 | Yang | B09C 1/002 |
| 2019/0314876 A1* | 10/2019 | Oberle | H05B 1/0227 |

FOREIGN PATENT DOCUMENTS

| | | |
|---|---|---|
| CN | 109047305 A | 12/2018 |
| CN | 109530420 A | 3/2019 |
| CN | 109848193 A | 6/2019 |
| CN | 110014036 A | 7/2019 |
| CN | 111069264 A | 4/2020 |
| CN | 111569625 A | 8/2020 |
| CN | 111960484 A | 11/2020 |
| CN | 112474768 A | 3/2021 |
| CN | 112547782 A | 3/2021 |
| CN | 113182335 A | 7/2021 |
| CN | 213613320 U | 7/2021 |
| CN | 214348608 U | 10/2021 |
| JP | 2008-272597 A | 11/2008 |
| WO | 2017/219792 A1 | 12/2017 |

OTHER PUBLICATIONS

CN First Office Action dated Oct. 31, 2022 as received in Application No. 202111660767.3.

CN Second Office Action dated May 16, 2023 as received in Application No. 202111660767.3.

* cited by examiner (a)

(b)

(c)

SOIL REMEDIATION SYSTEM AND SOIL REMEDIATION METHOD

TECHNICAL FIELD

The present disclosure belongs to the field of soil remediation, and particularly relates to a soil remediation system and a soil remediation method.

BACKGROUND

At present, in-situ remediation technologies for organic contaminated soil mainly include in-situ thermal desorption, in-situ chemical oxidation, and soil vapor extraction technologies. The in-situ thermal desorption technology has high remediation efficiency, a wide range of contaminants to be treated, and thorough remediation effects. However, it requires heating contaminated soil to a sufficiently high temperature (usually >100° C.) to volatilize the contaminants, which requires a large amount of engineering and extremely high energy consumption, resulting in high remediation costs. The chemical oxidation technology reduces or removes contaminants from a site through the oxidation characteristics of chemical oxidants themselves, a remediation cycle is short, and the cost is low; however, in this method, chemical reaction between a remediation agent and contaminants requires an appropriate temperature, in practical use, the reaction is often slow, the influencing radius is small due to the limitation of soil heterogeneity, and the contaminants in soil cannot be effectively and comprehensively oxidized and degraded, which often leads to contamination rebound after remediation, forming a smearing effect. The soil vapor extraction technology is a technology that uses vacuum pumps for pumping to produce negative pressure and forms airflow through a soil matrix to remove volatile organic contaminants from soil. However, this technology is only suitable for volatile organic compounds with a high Henry's constant, which has the problems such as low treatment efficiency, high cost of large-scale application, and long soil remediation time.

For example, a Chinese patent CN110014036A discloses a thermal strengthening assisted in-situ chemical oxidation method for remediating organic contaminated soil, which achieves the purpose of chemical oxidation remediation of soil through a simple combination of a high-pressure rotary injection device and a heating device. However, this disclosure only involves a simple continuous operation of chemical oxidation and soil heating, the heating range is small, soil cannot be uniformly heated, when there is overheating near the heating device, the position far away from the heating device may still be in an unheated state, on the one hand, it causes energy waste, on the other hand, there is a large temperature difference in the soil, a lower-temperature part cannot achieve thermal strengthening assisted in-situ chemical oxidation remediation of the organic contaminated soil, resulting in significant differences in treatment effect of contaminants in different portions of the soil and the poor treatment effect in low-temperature areas, and after stopping treatment for a period of time, adsorbed contaminants reversely permeate into underground water, causing the phenomena such as contaminant rebound and smearing.

SUMMARY OF THE INVENTION

Therefore, the technical problem to be solved by the present disclosure is to overcome the defects that in the prior art, during heating, energy waste is caused by the large difference in soil temperature, and a lower-temperature part cannot achieve thermal strengthening assisted in-situ chemical oxidation remediation of organic contaminated soil, resulting in significant differences in treatment effect of contaminants in different portions of soil, thereby providing a soil remediation system and a soil remediation method.

For this purpose, the present disclosure provides the following technical solution.

In a first aspect, a system for remediating contaminated soil is provided, including a heating unit and a pumping/injecting device for pumping underground water in soil and injecting a remediation agent into the soil.

Further, the pumping/injecting device includes a pumping/injecting pipeline, a pumping/injecting well as well as a vacuum pump and an injection pump connected with the pumping/injecting pipeline respectively.

Further, the pumping/injecting pipelines are arranged in multiple rows at intervals, the pumping/injecting pipelines include a first group of pumping/injecting pipelines and a second group of pumping/injecting pipelines, and each row of pumping/injecting pipeline in the first group of pumping/injecting pipelines and the second group of pumping/injecting pipelines is arranged alternately.

Further, at least one of the following (1) to (2) is met:
(1) a plurality of heating units are provided; and preferably, the plurality of heating units are arranged in soil to be remediated at intervals according to a triangle method, and more preferably, the triangle method is a regular triangle method; and
(2) each row of pumping/injecting pipeline is provided with a plurality of pumping/injecting wells at intervals, and preferably, the plurality of pumping/injecting wells are distributed according to a triangle method, and more preferably, the triangle method is a regular triangle method.

Further, the heating unit is an electrically driven heating rod or a hot circulating water driven heating tube; and/or
further, the injection pump is an injection diaphragm pump or a peristaltic pump.

In a second aspect, a method for remediating contaminated soil is provided, adopting the above system for remediating contaminated soil, and the method includes the following treatments: heating soil to be remediated; pumping underground water; and injecting a remediation agent.

Further, after heating for 3 to 5 days, the method further includes performing at least one pre-pumping treatment on underground water every day while heating; and preferably, in a process of each pre-pumping treatment, pumping is ended after an amount of pumped water is reduced to 50% to 70% of a peak value at the beginning of pumping or after pumping is performed 20 to 40 min.

Further, the treatment of pumping the underground water and the treatment of injecting the remediation agent are performed after an average temperature of the soil to be remediated is heated to 40° C. to 60° C.; and preferably, the treatment of pumping the underground water and the treatment of injecting the remediation agent are performed at a heat preservation condition of 40° C. to 60° C.

Further, the treatment of pumping the underground water and the treatment of injecting the remediation agent include the following steps:
step 1, starting a first group of pumping/injecting pipelines to pump the underground water, finishing pumping, and using a second group of pumping/injecting pipelines to inject the remediation agent;

step 2, repeating step 1;

step 3, starting the second group of pumping/injecting pipelines to pump the underground water, finishing pumping, and using the first group of pumping/injecting pipelines to inject the remediation agent; and step 4, repeating step 3; wherein preferably, steps 1 to 2 and steps 3 to 4 are performed alternately.

Further, in step 2, the treatment of pumping the underground water and the treatment of injecting the remediation agent are repeated 1 to 3 times a day for 7 to 10 days; and/or in step 4, the treatment of pumping the underground water and the treatment of injecting the remediation agent are repeated 1 to 3 times a day for 7 to 10 days.

Further, at least one of conditions A to C is met:

A, the remediation agent is at least one of an oxidation agent, a reduction agent and a biological promotion agent; preferably, the oxidation agent is selected from at least one of hydrogen peroxide, persulfate and potassium permanganate; the reduction agent is selected from at least one of a sodium hydroxide solution and vegetable oil; and the biological promotion agent is selected from at least one of a biochar source and urea;

preferably, a total application amount of the oxidation agent is 0.5% to 2% of the mass of the soil to be remediated; and C, an injection pressure of the remediation agent is 0.1 Mpa (normal pressure) to 1 Mpa.

The remediation agent may be injected under the normal pressure (0.1 MPa), that is, the remediation agent may be injected by own gravity without external pressure from the injection pump.

Exemplarily, the vegetable oil is rapeseed oil; and the biochar source is formic acid or potassium bicarbonate.

Further, the agent continues to be injected for 5 to 30 days after a concentration of contaminants is lowered to a value below a target value to consolidate the remediation effect.

Preferably, the method for remediating contaminated soil of the present disclosure is applicable to a saturated aquifer in which soil is silt to medium sand and with certain permeability. A hydraulic conductivity range is $10^{-4}$ cm/s to $10^{-6}$ cm/s.

When there are multiple remediation agents, the multiple remediation agents are directly injected after being dispensed and mixed according to proportions; or when the situation of reduction followed by oxidation under the ground needs to be considered, the reduction agent is injected first, and then the oxidation agent is injected.

Further, when an organic contaminant is chlorohydrocarbon, the remediation agent includes the reduction agent and the oxidation agent, and the situation of reduction followed by oxidation needs to be considered. When soil is treated, the reduction agent is injected first, and then the oxidation agent is injected.

Specifically, (1) the first group of pumping/injecting pipelines is started to pump the underground water, and the first group of pumping/injecting pipelines is shut down after an amount of pumped water is reduced to 50% to 70% of a peak value at the beginning of pumping to stop pumping of the underground water; and the second group of pumping/injecting pipelines is used to inject part of the reduction agent, an injection pressure of the reduction agent is 0.1 MPa to 1 Mpa, and a PH value is adjusted to 9 to 12, preferably 12;

(2) above step (1) is repeated 1 to 3 times a day for 5 to 7 days with the PH value stabilized at about 12, and then reaction continues for 2 to 5 days without pumping and injection of the agent during the reaction;

(3) the second group of pumping/injecting pipelines is started to pump the underground water, the second group of pumping/injecting pipelines is shut down after an amount of pumped water is reduced to 50% to 70% of a peak value at the beginning of pumping to stop pumping of the underground water; and the first group of pumping/injecting pipelines is used to inject part of the reduction agent, and an injection pressure of the reduction agent is 0.1 MPa to 1 Mpa;

(4) above step (3) is repeated 1 to 3 times a day for 5 to 7 days with the PH value stabilized at about 12, and then reaction continues for 2 to 5 days without pumping and injection of the agent during the reaction;

(5) the first group of pumping/injecting pipelines is started to pump the underground water, and the first group of pumping/injecting pipelines is shut down after an amount of pumped water is reduced to 50% to 70% of a peak value at the beginning of pumping to stop pumping of the underground water; and the second group of pumping/injecting pipelines is used to inject part of the oxidation agent, and an injection pressure of the oxidation agent is 0.1 MPa to 1 Mpa;

(6) above step (5) is repeated 1 to 3 times a day for 7 to 10 days;

(7) the second group of pumping/injecting pipelines is started to pump the underground water, the second group of pumping/injecting pipelines is shut down after an amount of pumped water is reduced to 50% to 70% of a peak value at the beginning of pumping to stop pumping of the underground water; and the first group of pumping/injecting pipelines is used to inject part of the oxidation agent, and an injection pressure of the oxidation agent is 0.1 MPa to 1 Mpa;

(8) above step (7) is repeated 1 to 3 times a day for 7 to 10 days; and (9) steps (1) to (4) and steps (5) to (8) are performed alternately until the contaminants in the soil are lowered to a value below a target value, thus finishing soil remediation; and preferably, the agent continues to be injected for 5 to 30 days after a concentration of the contaminants in the soil is lowered to the value below the target value to consolidate the remediation effect.

The technical solution of the present disclosure has the following advantages:

1. the system for remediating contaminated soil provided by the present disclosure includes the heating unit and the pumping/injecting device, and the pumping/injecting device is used for pumping underground water in soil and injecting a remediation agent into the soil. The pumping/injecting device pumps the underground water in the soil, thus accelerates the flow of underground water, drives heat conduction and temperature rise, and reduces temperature differences in different areas of the soil. On the one hand, energy waste is reduced, compared to a traditional high-temperature in-situ thermal desorption system, the present disclosure only needs to provide a small amount of heat to heat the average temperature of the soil to a target temperature and enter a heat preservation state, and effectively degrade contaminants, which greatly reduces energy consumption, and through the implementation of this technological demonstration project, remediation compliance can be achieved with the energy consumption of the technology of the present disclosure being only about 30% of that of traditional in-situ heating. On the other hand, it ensures that the entire soil can achieve thermal strengthening assisted in-situ chemical oxidation remediation. Heating can promote the desorption of adsorbed contaminants in the soil, and then the contaminants are removed by the remediation agent. In the present disclosure, by means of overall uniform heating of the soil, it avoids the situations that the treatment effect in low-temperature areas is poor due to non-uniform heating, and after stopping treatment for a period of time, adsorbed contaminants reversely permeate into underground water, causing the phenomena such as contaminant rebound and smearing.

Moreover, pumping the underground water in the soil can create negative pressure in the soil, promote the spread of the remediation agent in the soil, increase the influencing radius of the remediation agent, and further ensure that thermal strengthening assisted in-situ chemical oxidation remediation can be achieved in the soil. Meanwhile, it avoids the problems that, in the prior art, in order to expand the spread radius of remediation agents in soil, high-pressure rotary injection is adopted, a large amount of remediation agents are required to be injected, soil fracturing may be caused to form cracks, the agents are preferentially distributed in the cracks, which cannot achieve uniform distribution of the agents, and the contact between the agents and contaminants is not sufficient, making it impossible to achieve true heating oxidation remediation.

2. In the system for remediating contaminated soil provided by the present disclosure, the pumping/injecting pipelines include the first group of pumping/injecting pipelines and the second group of pumping/injecting pipelines, and each row of pumping/injecting pipeline in the first group of pumping/injecting pipelines and the second group of pumping/injecting pipelines is arranged alternately. By arranging the first group of pumping/injecting pipelines and the second group of pumping/injecting pipelines alternately, pumping of every other row can be achieved, and the treatment effect is better.

3. In the system for remediating contaminated soil provided by the present disclosure, the plurality of heating units are provided; preferably, the plurality of heating units are arranged in the soil to be remediated at intervals according to a triangle method; the pumping/injecting pipelines are arranged in multiple rows at intervals; and each row of pumping/injecting pipeline is provided with the plurality of pumping/injecting wells at intervals, and the pumping/injecting wells are distributed according to a triangle method. By arranging the plurality of heating units and the pumping/injecting pipelines, the uniformity of heating, underground water pumping and distribution of injected agents can be improved, and the heating units and the pumping/injecting wells are distributed according to the triangle method, so that the treatment effect is better.

4. The method for remediating contaminated soil provided by the present disclosure includes the following steps: heating the soil to be remediated; pumping the underground water; and injecting the remediation agent. In the present disclosure, an in-situ heating technology is coupled with an in-situ chemical oxidation and/or in-situ chemical reduction and/or in-situ microbial technology, driving the flow of underground water by pumping can achieve efficient and uniform heating of site soil, the non-uniform heating defect of a high temperature near a heating well and a low temperature at a cold point in a conventional in-situ heat conduction technology is overcome, a relatively uniform soil temperature environment is provided, and the desorption of adsorbed contaminants in the soil is promoted; meanwhile, the remediation agent is quickly thermally activated under heating conditions, which achieves effective degradation of organic contaminants in the soil; and the improved in-situ chemical and microbial promotion technology has high remediation efficiency, can achieve a relatively consistent remediation effect on contaminants in different areas of the soil, and at the same time, the time of the entire soil remediation process can be effectively shortened.

5. In the method for remediating contaminated soil provided by the present disclosure, after heating for 3 to 5 days, the method further includes performing at least one pre-pumping treatment on underground water every day while heating. The underground water in the soil is pumped in the heating process, it can accelerate the flow of underground water, drive heat conduction and temperature rise, and reduce temperature differences in different areas of the soil, thus achieving overall uniform heating of the soil; and it avoids the situations that the treatment effect in low-temperature areas is poor due to non-uniform heating, and after stopping treatment for a period of time, adsorbed contaminants reversely permeate into underground water, causing the phenomena such as contaminant rebound and smearing.

The effective time of the remediation agent is limited, usually ranging from 1 day to 1 month, whereas a soil heating rate is low, so if the agent is injected first and then heating is performed, the remediation agent may have become ineffective when a thermal field arrives; and in the present disclosure, the agent is injected in the case of heat preservation after the soil temperature is raised to a target temperature, which can ensure the combination effect of the thermal field and the remediation agent.

6. In the method for remediating contaminated soil provided by the present disclosure, the treatment of pumping the underground water and the treatment of injecting the remediation agent include the following steps: step 1, starting the first group of pumping/injecting pipelines to pump the underground water, finishing pumping, and using the second group of pumping/injecting pipelines to inject the remediation agent; step 2, repeating step 1; step 3, starting the second group of pumping/injecting pipelines to pump the underground water, finishing pumping, and using the first group of pumping/injecting pipelines to inject the remediation agent; and step 4, repeating step 3; and preferably, steps 1 to 2 and steps 3 to 4 are performed alternately.

By adopting the modes of pumping of every other row and intermittent pumping/injecting work, a water head difference and negative pressure brought about can better diffuse the injected agent, the influencing radius is increased, the uniformity of distribution is improved, and thus the removal effect of contaminants in different areas of the soil is guaranteed.

Compared to a traditional in-situ chemical oxidation remediation technology, the present disclosure is applicable to a wider range of contaminant concentrations, which breaks through a concentration interval in which the traditional in-situ chemical oxidation remediation technology cannot achieve remediation compliance. Through the implementation of this technological demonstration project, the consumption of chemical agents is only about 50% of a target dosage of the traditional in-situ chemical oxidation technology, and it avoids the problems of rebound and smearing that often occur in conventional chemical oxidation.

7. In the method for remediating contaminated soil provided by the present disclosure, the injection pressure of the remediation agent is 0.1 MPa to 1 Mpa. The injection pressure of the remediation agent in the present disclosure is relatively low, and soil cracks cannot be caused during injection; and moreover, it can match with the appropriate negative pressure caused by pumping of the underground water, and a larger influencing radius and better distribution uniformity can be achieved in the soil.

BRIEF DESCRIPTION OF THE DRAWINGS

In order to describe technical solutions in specific implementations of the present disclosure or in the prior art more clearly, the accompanying drawings that need to be used in the description of the specific implementations or the prior art will be briefly introduced below. Apparently, the accompanying drawings in the following description are some implementations of the present disclosure, and for those of ordinary skill in the art, on the premise of no creative labor, other accompanying drawings may also be obtained from these accompanying drawings.

REFERENCE NUMERALS

1—pumping/injecting well; 2—pumping/injecting pipeline; 201—first group of pumping/injecting pipelines; 202—second group of pumping/injecting pipelines; 3—injection pump; 4—vacuum pump; and 5—heating unit.

DETAILED DESCRIPTION

The following examples are provided for a better further understanding of the present disclosure and are not limited to the optimal implementations, they do not limit the content and scope of protection of the present disclosure, and any product that is the same as or similar to the present disclosure obtained by anyone under the inspiration of the present disclosure or by combining the present disclosure with other prior art features falls within the scope of protection of the present disclosure.

If specific experimental steps or conditions are not specified in the examples, the operation or conditions of conventional experimental steps described in the literature in this art can be carried out. The adopted reagents or instruments which are not specified with the manufacturer are all conventional commercially-available reagent products.

Example 1

Figure 1:
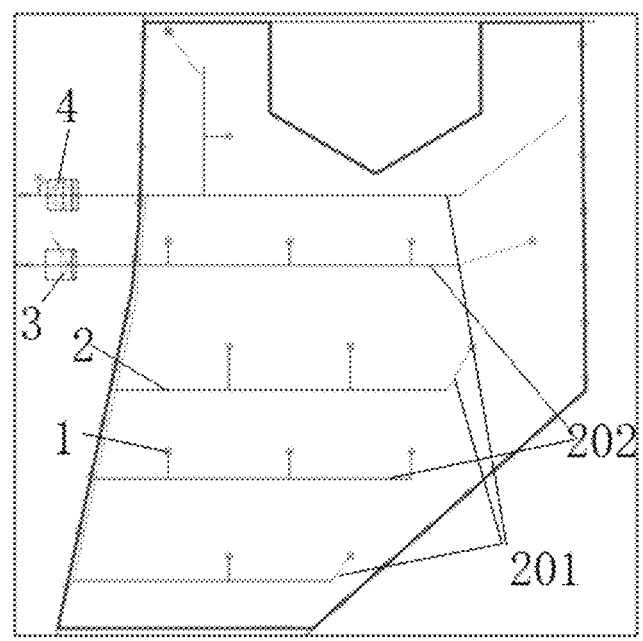
FIG. 1 is a schematic structural diagram of a system for remediating contaminated soil in Example 1 of the present disclosure.
Figure 2:
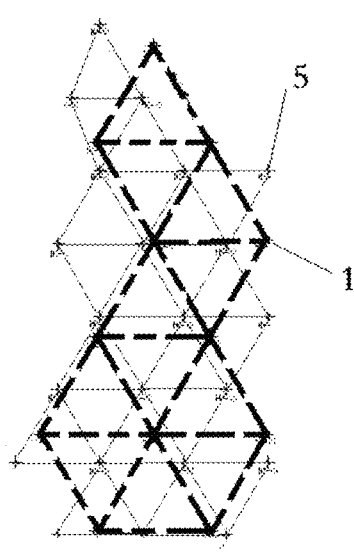
FIG. 2 is a schematic diagram of local distribution of heating units and pumping/injecting wells in Example 1 of the present disclosure.

This example provides a system for remediating contaminated soil, as shown in FIG. 1 and FIG. 2, including heating units 5 and a pumping/injecting device, and the pumping/injecting device is used for pumping underground water in soil and injecting a remediation agent into the soil. Exemplarily, each of the heating units 5 is an electrically driven heating rod or a hot water driven heating tube.

The heating units 5 are used for heating the contaminated soil, and by pumping the underground water in the soil, the pumping/injecting device accelerates the flow of underground water, promotes migration of high-temperature underground water near the heating units 5 to a low-temperature area, drives heat conduction and temperature rise, and reduces temperature differences in different areas of the soil.

Specifically, the pumping/injecting device includes pumping/injecting pipelines 2 as well as vacuum pumps 4 and injection pumps 3 connected with the pumping/injecting pipelines 2 respectively. Exemplarily, each of the vacuum pumps 4 is a water ring vacuum pump 4, and each of the injection pumps 3 is an injection diaphragm pump or a peristaltic pump. When it requires to pump the underground water in the soil, the vacuum pumps 4 are started; and when it requires to inject the remediation agent into the soil, the injection pumps 3 are started.

The pumping/injecting pipelines 2 are arranged in multiple rows at intervals, the multiple rows of pumping/injecting pipelines 2 include a first group of pumping/injecting pipelines 201 and a second group of pumping/injecting pipelines 202, and the first group of pumping/injecting pipelines 201 and the second group of pumping/injecting pipelines 202 are arranged at intervals. The first group of pumping/injecting pipelines 201 or the second group of pumping/injecting pipelines 202 is used for pumping the underground water, and then the other group of pumping/injecting pipelines is used for injecting the remediation agent. A water head difference and negative pressure brought about by pumping of every other row can better diffuse the injected agent, the influencing radius is increased, the uniformity of distribution is improved, and thus the efficiency of chemical oxidation remediation is facilitated.

The plurality of heating units 5 are arranged and evenly spread over a contaminated soil area; and the multiple rows of pumping/injecting pipelines 2 are arranged and evenly spread over the contaminated soil area, and each row of pumping/injecting pipeline 2 is provided with a plurality of pumping/injecting wells 1 at intervals. Preferably, the heating units 5 are evenly distributed according to a triangle method, and more preferably, the heating units 5 in this example are evenly distributed according to a regular triangle method. The plurality of pumping/injecting wells 1 are distributed according to a triangle method, more preferably, the plurality of pumping/injecting wells 1 in this example are distributed according to a regular triangle, a distance between every two heating units 5 is 2.5 m to 5 m, and a distance between every two pumping/injecting wells 1 is 4 m to 8 m. Exemplarily, as shown in FIG. 2, in this example, the distance between every two heating units 5 is 3 m, and the distance between every two pumping/injecting wells 1 is 4 m.

The system for remediating contaminated soil further includes a temperature monitoring unit, for example, it may be a conventional temperature sensor, and preferably, a plurality of temperature monitoring units are provided and are evenly distributed in the contaminated soil area to be used for detecting temperatures in various positions of the contaminated soil area.

Example 2

This example provides a method for remediating contaminated soil. Soil to be remediated is a silt saturated aquifer, with a hydraulic conductivity being $10^{-5}$ cm/s to $10^{-6}$ cm/s. Organic contaminants include chloroform, trichloroethylene, tetrachloroethylene and tetrachloroethane (specifically 1,1,2,2tetrachloroethane). Remediation agents are: a sodium persulfate solution with a mass fraction of 10% and a sodium hydroxide solution with a mass fraction of 32%. An earth volume of the soil to be remediated is 2800 $m^3$ (about 5,000 tons), and for completing remediation, a total application amount of sodium persulfate is 25 tons, a total application amount of the sodium hydroxide solution is 9 $m^3$, and a total application amount of the sodium persulfate is 0.5% of the mass fraction of the soil to be remediated.

This example provides the method for remediating contaminated soil, which specifically adopts the system for remediating contaminated soil in Example 1, and the method includes the following steps:

S1. the soil to be remediated is heated using the heating units;

S2. after heating for 5 days, the vacuum pumps and all the pumping/injecting pipelines are started to perform pre-pumping on underground water in the soil, pumping is ended after an amount of pumped water is reduced to 70% of a peak value at the beginning of pumping, and pre-pumping of underground water is repeated twice every day; and heat is preserved after an average temperature of the soil to be remediated reaches 55° C.; and S3. (1) the first group of pumping/injecting pipelines is started to pump the underground water, and the first group of pumping/injecting pipelines is shut down after an amount of pumped water is reduced to 70% of a peak value at the beginning of pumping to stop pumping of the underground water; and the second group of pumping/injecting pipelines is used to inject the sodium hydroxide solution, 167 L of the sodium hydroxide solution is injected each time, and an injection pressure of the sodium hydroxide solution is 0.1 MPa;

(2) step (1) is repeated twice a day for 7 days, and then reaction is performed under heat preservation for 3 days to make the sodium hydroxide solution and the contaminants react;

(3) the second group of pumping/injecting pipelines is started to pump the underground water, and the second group of pumping/injecting pipelines is shut down after an amount of pumped water is reduced to 70% of a peak value at the beginning of pumping to stop pumping of the underground water; and the first group of pumping/injecting pipelines is used to inject the sodium hydroxide solution, 167 L of the sodium hydroxide solution is injected each time, and an injection pressure of the sodium hydroxide solution is 0.1 MPa;

(4) step (3) is repeated twice a day for 7 days, and then reaction is performed under heat preservation for 3 days to make the sodium hydroxide solution and the contaminants react;

(5) the first group of pumping/injecting pipelines is started to pump the underground water, and the first group of pumping/injecting pipelines is shut down after an amount of pumped water is reduced to 70% of a peak value at the beginning of pumping to stop pumping of the underground water; and the second group of pumping/injecting pipelines is used to inject the sodium persulfate solution, an application amount of the sodium persulfate each time is 625 kg, and an injection pressure of the sodium persulfate solution is 0.1 MPa;

(6) above step (5) is repeated twice a day for 10 days;

(7) the second group of pumping/injecting pipelines is started to pump the underground water, and the second group of pumping/injecting pipelines is shut down after an amount of pumped water is reduced to 70% of a peak value at the beginning of pumping to stop pumping of the underground water; and the first group of pumping/injecting pipelines is used to inject the sodium persulfate solution, an application amount of the sodium persulfate each time is 625 kg, and an injection pressure of the sodium persulfate solution is 0.1 MPa;

(8) above step (7) is repeated twice a day for 10 days; and (9) steps (1) to (4) and steps (5) to (8) are performed alternately.

Figure 5:
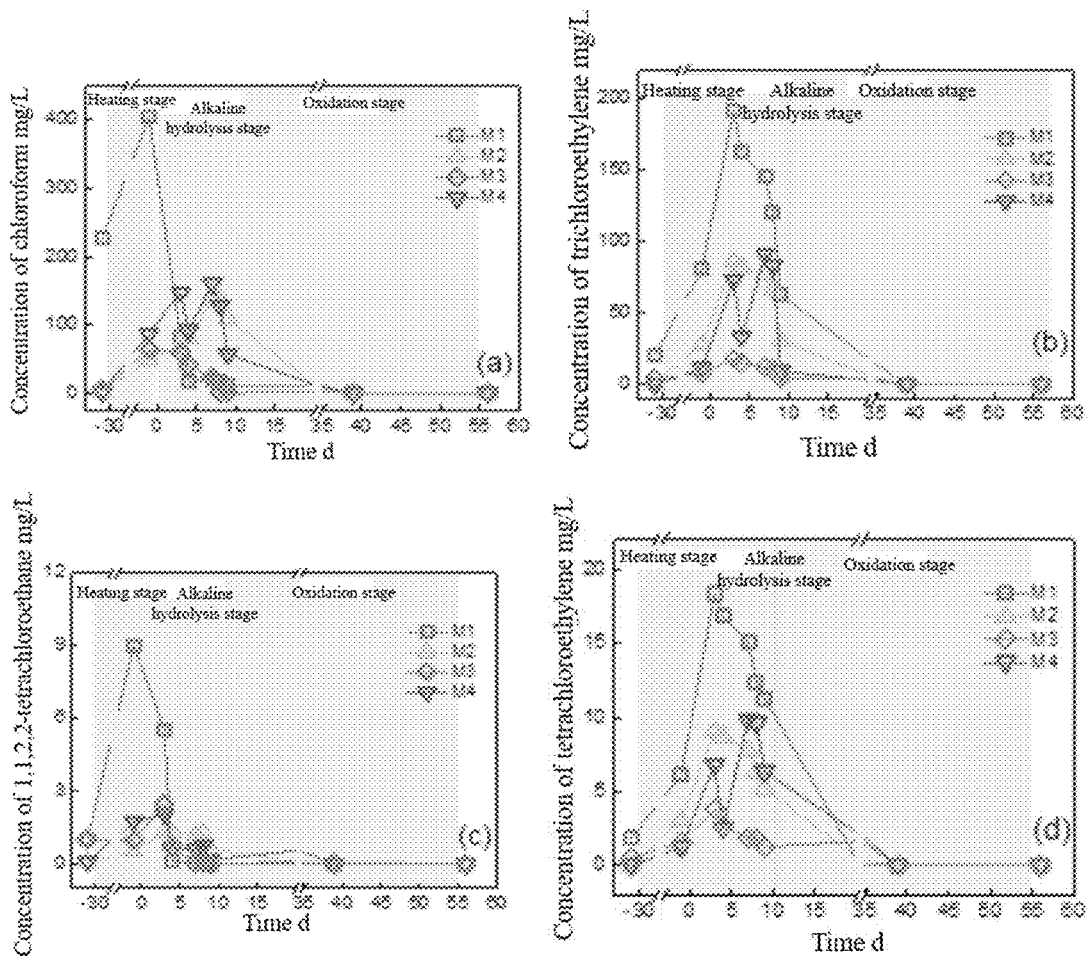
FIG. 5 is concentration change curves of four contaminants in underground water in Example 2;
  (a) concentration change curve of chloroform, (b) concentration change curve of trichloroethylene, (c) concentration change curve of tetrachloroethane, and (d) concentration change curve of tetrachloroethylene.

As shown in FIG. 5, a moment when the remediation agent is first injected is recorded as day 0, the contaminants in the soil are lowered to a value below a target value 39 days after injection of the agent, and the agent continues to be injected to day 56 to complete soil remediation.

Example 3

This example provides a method for remediating contaminated soil. The soil is a high-permeability site, with a hydraulic conductivity being $10^{-4}$ cm/s to $10^{-5}$ cm/s. Organic contaminants are benzene series petroleum hydrocarbons, including benzene, toluene, xylene and ethylbenzene. A remediation agent is a sodium persulfate solution with a mass fraction of 10%. An earth volume of soil to be remediated is 5500 $m^3$ (about 10,000 tons). A total application amount of the remediation agent is 100 tons, which is 1% of the mass of the contaminated soil to be remediated.

This example adopts the system for remediating contaminated soil in Example 1, and the method for remediating contaminated soil includes the following steps:

S1. the soil to be remediated is subjected to low-temperature heating using the heating units;

S2. after heating for 5 days, the vacuum pumps and all the pumping/injecting pipelines are started to perform pre-pumping on underground water in the soil, pumping is ended after 20 min of pumping each time, pre-pumping of underground water is repeated 3 times every day, and heat is preserved after an average temperature of the soil to be remediated reaches 60° C.; and S3. (1) the first group of pumping/injecting pipelines is started to pump the underground water, and the first group of pumping/injecting pipelines is shut down after 20 min of pumping to stop pumping of the underground water; and the second group of pumping/injecting pipelines is used to inject the sodium persulfate solution, and an injection pressure of the sodium persulfate solution is 0.5 Mpa;

(2) step (1) is repeated once a day for 7 days;

(3) the second group of pumping/injecting pipelines is started to pump the underground water, and the second group of pumping/injecting pipelines is shut down after 20 min of pumping to stop pumping of the underground water; and the first group of pumping/injecting pipelines is used to inject the sodium persulfate solution, and an injection pressure of the sodium persulfate solution is 0.5 Mpa;

(4) step (3) is repeated once a day for 7 days; and (5) steps (1) to (2) and steps (3) to (4) are performed alternately until the concentration of the contaminants is lowered to a value below a target value to complete remediation of the soil to be remediated.

Example 4

This example provides a method for remediating contaminated soil. A hydraulic conductivity of the soil is $10^{-5}$ cm/s to $10^{-6}$ cm/s. Organic contaminants are polycyclic aromatic hydrocarbons, including naphthalene, anthracene, phenanthrene, and benzo[a] pyrene. A remediation agent is a sodium persulfate solution with a mass fraction of 10%. An earth volume of soil to be remediated is 2800 m$^3$ (about 5,000 tons). A total application amount of the remediation agent is 80 tons, which is 1.6% of the mass of the contaminated soil to be remediated.

This example adopts the system for remediating contaminated soil in Example 1, and the method for remediating contaminated soil includes the following steps:

S1. the soil to be remediated is subjected to low-temperature heating using the heating units;

S2. after heating for 4 days, the vacuum pumps and all the pumping/injecting pipelines are started to perform pre-pumping on underground water in the soil, pumping is ended after an amount of pumped water is reduced to 60% of a peak value at the beginning of pumping, pre-pumping of underground water is repeated 3 times every day, and heat is preserved after an average temperature of the soil to be remediated reaches 50° C.; and S3. (1) the first group of pumping/injecting pipelines is started to pump the underground water, and the first group of pumping/injecting pipelines is shut down after an amount of pumped water is reduced to 60% of a peak value at the beginning of pumping to stop pumping of the underground water; and the second group of pumping/injecting pipelines is used to inject the sodium persulfate solution, and an injection pressure of the sodium persulfate solution is 0.3 Mpa;

(2) step (1) is repeated 3 times a day for 8 days;

(3) the second group of pumping/injecting pipelines is started to pump the underground water, and the second group of pumping/injecting pipelines is shut down after an amount of pumped water is reduced to 60% of a peak value at the beginning of pumping to stop pumping of the underground water; and the first group of pumping/injecting pipelines is used to inject the sodium persulfate solution, and an injection pressure of the sodium persulfate solution is 0.3 Mpa;

(4) step (3) is repeated 3 times a day for 8 days; and (5) steps (1) to (2) and steps (3) to (4) are performed alternately until the concentration of the contaminants is lowered to a value below a target value to complete remediation of the soil to be remediated.

Comparative Example 1

This comparative example provides a method for remediating contaminated soil. In this comparative example, a contaminated site, the type and dosage of remediation agents as well as an injection method of the remediation agents are the same as those of Example 2, and the difference lies in that pumping of underground water is not performed during temperature rise and during subsequent agent injection.

The method includes the following steps:

S1. soil to be remediated is heated using the heating units;

S2. heating time is the same as the time adopted in the heating process in S2 in Example 2; and S3. (1) the second group of pumping/injecting pipelines is used for injecting a sodium hydroxide solution, and an injection pressure of the sodium hydroxide solution is 0.1 MPa;

(2) step (1) is repeated twice a day for 7 days, and then reaction is performed under heat preservation for 3 days to make the sodium hydroxide solution and contaminants react;

(3) the first group of pumping/injecting pipelines is used for injecting a sodium hydroxide solution, and an injection pressure of the sodium hydroxide solution is 0.1 MPa;

(4) step (3) is repeated twice a day for 7 days, and then reaction is performed under heat preservation for 3 days to make the sodium hydroxide solution and the contaminants react;

(5) the second group of pumping/injecting pipelines is used for injecting a sodium persulfate solution, and an injection pressure of the sodium persulfate solution is 0.1 MPa;

(6) above step (5) is repeated twice a day for 10 days;

(7) the first group of pumping/injecting pipelines is used for injecting a sodium persulfate solution, and an injection pressure of the sodium persulfate solution is 0.1 MPa;

(8) above step (7) is repeated twice a day for 10 days; and (9) steps (1) to (4) and steps (5) to (8) are performed alternately, and the time from the beginning of injection of the agents to ending of the treatment is the same as that of Example 2.

Experimental Example 1

According to "HJ 605-2011—Soil and Sediments—Determination of Volatile Organic Compounds—Purge and Trap Gas Chromatography-Mass Spectrometry Method", the contents of underground water contaminants before and after soil remediation in Example 2 and Comparative Example 1 were detected. Organic contaminants included chloroethylene, cis-1,2-dichloroethylene, chloroform, 1,2-dichloroethane, trichloroethylene, 1,1,2-trichloroethane, tetrachloroethane, tetrachloroethylene, and hexachlorobutadiene. Various contaminants at random monitoring points (denoted as M1-M5 respectively) in soil were detected at different times. A moment when a remediation agent was first injected was recorded as day 0, before 0 was a temperature rise process in which no agent was injected, and the time was recorded as a negative number. Detection results were as shown in Table 1 and Table 2, and ND referred to "not detected".

TABLE 1

Contaminant remediation target and contaminant content in Example 2

| | Remediation target value | Days d with respect to agent injection day | −31 | −1 | 3 | 4 | 7 | 8 | 9 | 23 | 39 | 56 |
|---|---|---|---|---|---|---|---|---|---|---|---|---|
| Chloroform mg/L | 0.300 | M1 | 227.00 | 404.00 | 81.83 | 17.24 | 20.41 | 16.86 | 11.21 | 12.50 | ND | ND |
| | | M2 | 3.43 | 49.70 | 68.97 | 81.88 | 136.74 | 137.94 | 109.37 | 8.48 | 0.06 | 0.03 |
| | | M3 | 5.18 | 64.00 | 59.64 | 40.32 | 23.38 | 1.21 | 0.66 | 4.13 | ND | ND |
| | | M4 | 2.37 | 88.10 | 147.61 | 91.65 | 160.62 | 128.23 | 57.51 | 10.90 | ND | ND |
| Trichloroethylene mg/L | 0.210 | M1 | 20.50 | 81.00 | 191.85 | 162.90 | 145.82 | 120.19 | 62.59 | 16.85 | ND | ND |
| | | M2 | 0.02 | 28.30 | 85.77 | 82.41 | 77.18 | 66.03 | 30.99 | 5.89 | 0.12 | ND |
| | | M3 | 4.30 | 8.07 | 18.21 | 15.28 | 11.90 | 10.67 | 4.26 | 3.89 | ND | ND |
| | | M4 | 0.12 | 11.80 | 73.34 | 33.68 | 91.30 | 83.10 | 9.34 | 3.39 | ND | ND |
| Tetrachloroethylene mg/L | 0.300 | M1 | 1.88 | 6.11 | 18.30 | 16.80 | 15.07 | 12.37 | 11.28 | 0.02 | ND | ND |
| | | M2 | ND | 3.04 | 9.05 | 8.73 | 7.77 | 6.28 | 5.20 | 0.38 | 0.02 | ND |
| | | M3 | 0.54 | 1.58 | 3.86 | 2.69 | 1.85 | 1.82 | 1.27 | 1.67 | ND | ND |
| | | M4 | ND | 1.24 | 6.82 | 2.56 | 9.83 | 9.59 | 6.33 | 2.03 | ND | ND |
| 1,1,2,2tetrachloroethane mg/L | 0.100 | M1 | 1.02 | 9.01 | 5.55 | 0.09 | 0.07 | 0.05 | 0.00 | 0.09 | ND | ND |
| | | M2 | 0.09 | 0.51 | 1.32 | 1.32 | 1.21 | 1.31 | 0.61 | 0.09 | 0.10 | ND |
| | | M3 | 1.02 | 0.98 | 2.50 | 0.71 | 0.05 | 0.05 | 0.00 | 0.00 | ND | ND |
| | | M4 | 0.12 | 1.75 | 2.05 | 0.67 | 0.61 | 0.76 | 0.18 | 0.57 | ND | ND |

TABLE 2

Content of underground water contaminants in Comparative Example 1

| | Days d with respect to agent injection day | −31 | −1 | 3 | 4 | 7 | 8 | 9 | 24 | 39 | 56 |
|---|---|---|---|---|---|---|---|---|---|---|---|
| Chloroform mg/L | M5 | 5.223 | 18.531 | 21.789 | 64.624 | 65.22 | 62.816 | 128.371 | 83.592 | 31.300 | 65.773 |
| Trichloroethylene mg/L | M5 | 2.531 | 4.877 | 5.687 | 23.948 | 13.414 | 13.657 | 10.038 | 24.837 | 20.711 | 25.635 |
| Tetrachloroethane mg/L | M5 | 0.734 | 0.471 | 1.008 | 9.042 | 2.995 | 2.869 | 1.123 | 0.455 | 1.240 | 2.327 |
| Tetrachloroethylene mg/L | M5 | 2.128 | 2.416 | 3.080 | 17.194 | 9.687 | 9.390 | 14.965 | 4.522 | 6.140 | 8.781 |

It could be seen from FIG. 5 and Table 1 that, as for the contaminants in Example 2, 39 days after the agents were injected, the concentrations of the organic contaminants chloroform, trichloroethylene, tetrachloroethane and tetrachloroethylene at four monitoring points were all reduced to values below target values, the agents continued to be injected to day 56, and the concentrations of the contaminants were still below the target values without rebound. After treatment was ended, the organic contaminants were re-detected once every 3 months, and there was no rebound phenomenon.

Figure 7:
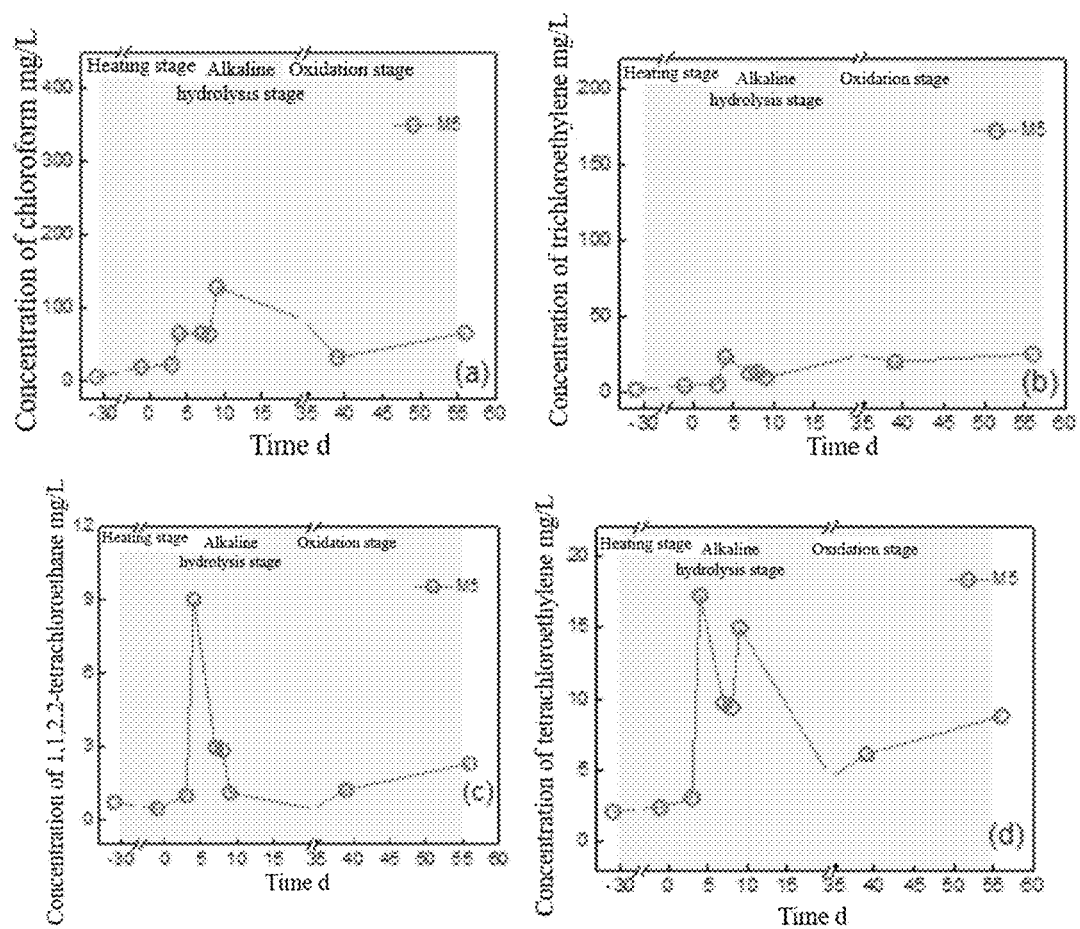
FIG. 7 is concentration change curves of four contaminants in underground water in Comparative Example 1;
  (a) concentration change curve of chloroform, (b) concentration change curve of trichloroethylene, (c) concentration change curve of tetrachloroethane, and (d) concentration change curve of tetrachloroethylene.

It could be seen from FIG. 7 and Table 2 that, as for the contaminants in Comparative Example 1, 39 days after the agents were injected, the concentrations of the contaminants were still not reduced to values below target values, the agents continued to be injected, at day 56, the concentrations of the contaminants rebounded, and the soil remediation effect was poor and not thorough. After treatment was ended, the organic contaminants were re-detected once every 3 months, and rebound occurred.

Figure 4:
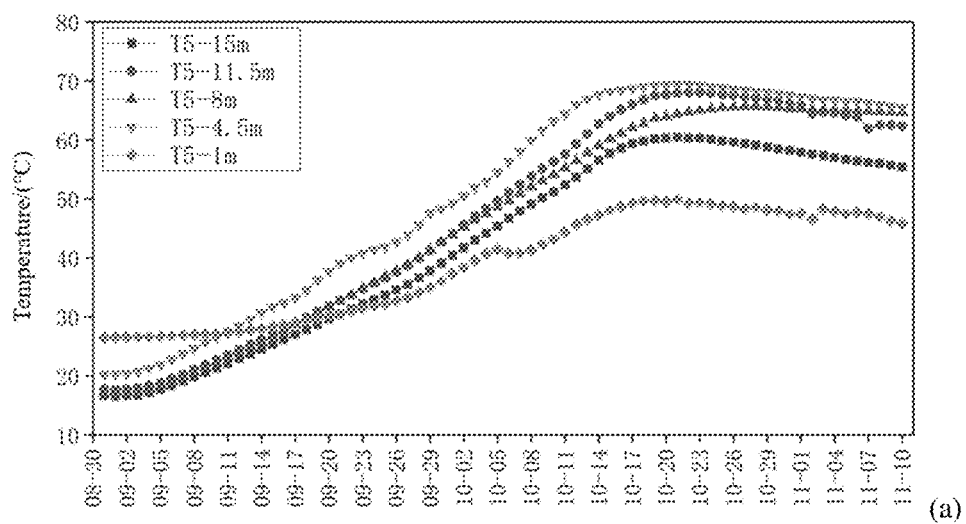
FIG. 4 is temperature monitoring diagrams of the temperature monitoring points in Example 2;
  (a) T5 temperature monitoring diagram, (b) T6 temperature monitoring diagram, (c) T7 temperature monitoring diagram, and (d) T8 temperature monitoring diagram.
Figure 4:
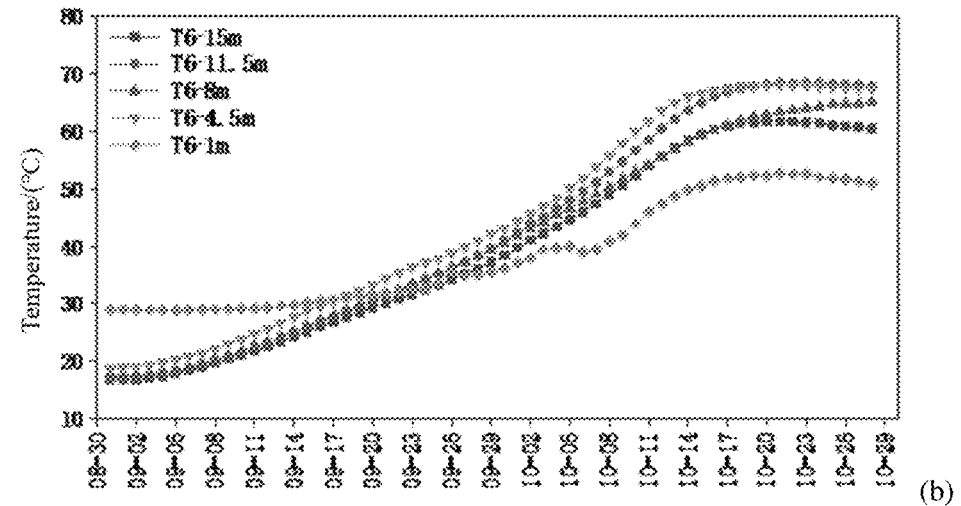
Figure 4:
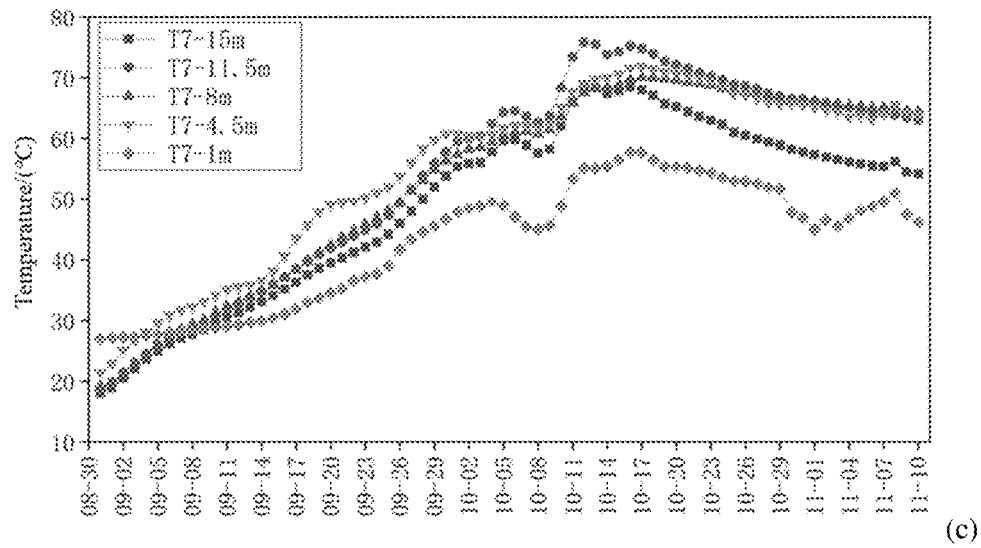
Figure 4:
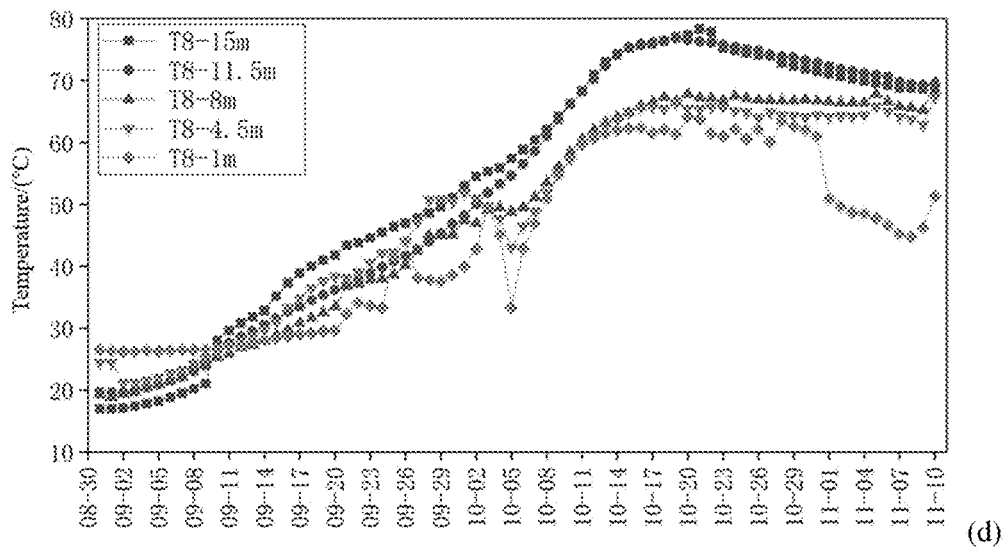

FIG. 4 is temperature monitoring diagrams of temperature monitoring points in Example 2. Each of figures (a) to (d) in FIG. 4 contains temperature monitoring curves for the same temperature monitoring point at different distances (1 m, 4.5 m, 8 m, 11.5 m and 15 m) from the ground.

Figure 6:
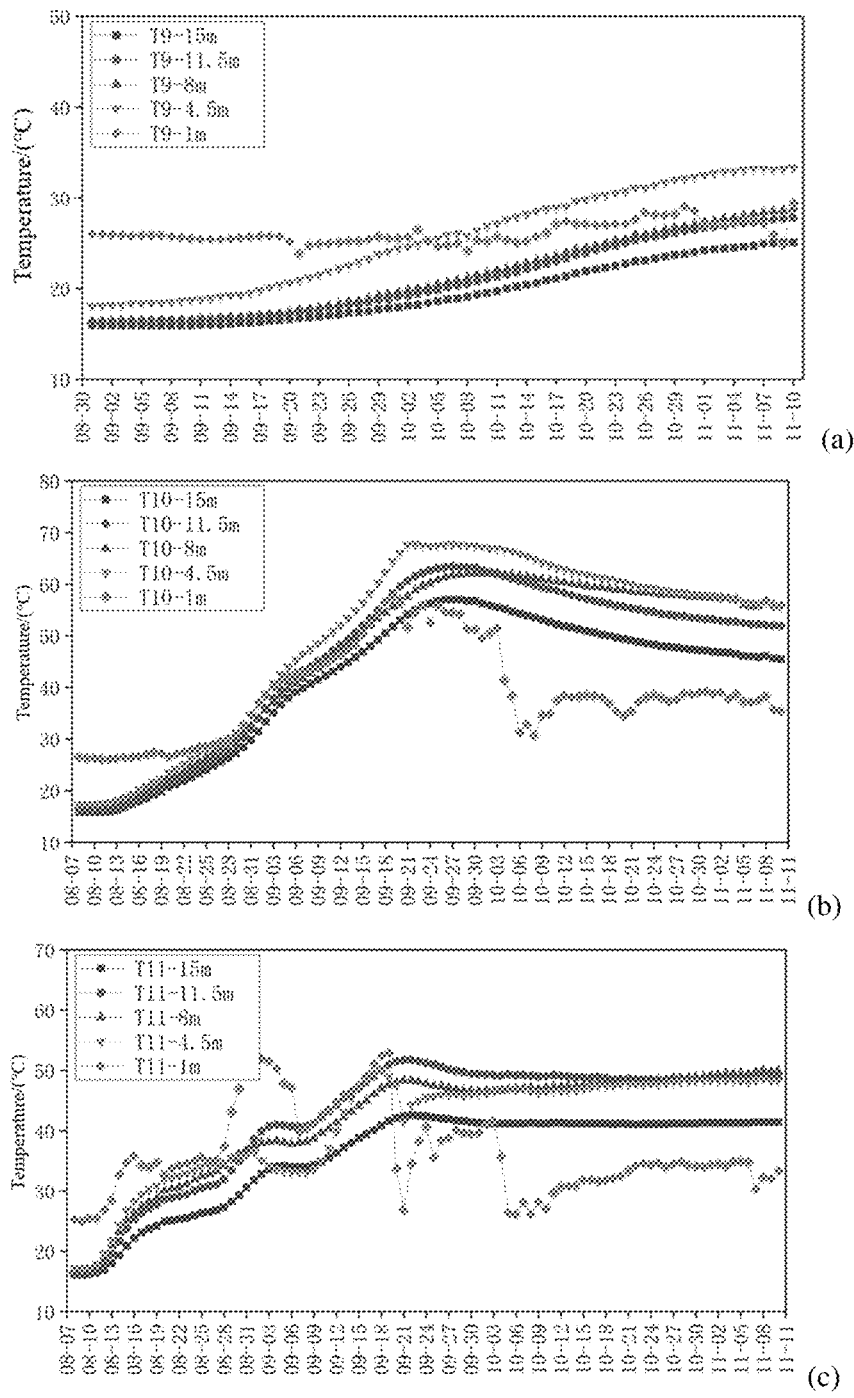
FIG. 6 is temperature monitoring diagrams of temperature monitoring points with different distances from the same heating well in Comparative Example 1;
  (a) T9 (1.5 m) temperature monitoring diagram, (b) T10 (1 m) temperature monitoring diagram, and (c) T11 (0.5 m) temperature monitoring diagram.

FIG. 6 is temperature monitoring diagrams of temperature monitoring points with different distances from the same heating well in Comparative Example 1. The distance in T9 is 1.5 m, the distance in T10 is 1 m, and the distance in T11 is 0.5 m. Each of figures (a) to (d) in FIG. 6 contains temperature monitoring curves for the same temperature monitoring point at different distances (1 m, 4.5 m, 8 m, 11.5 m and 15 m) from the ground.

Figure 3:
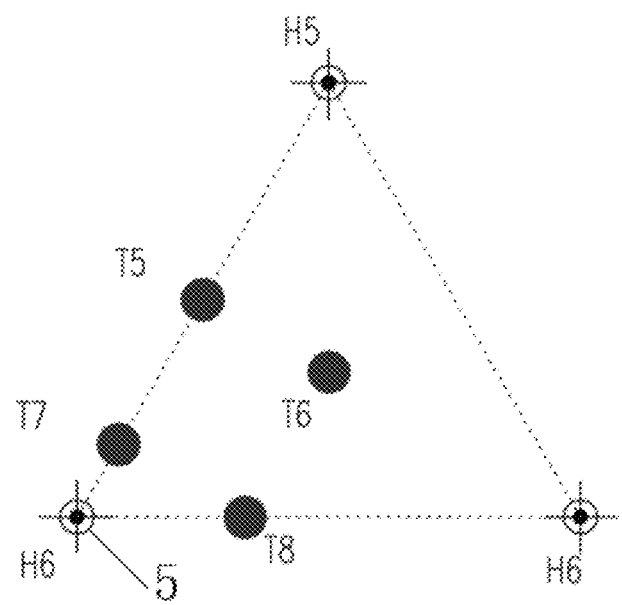
FIG. 3 is temperature monitoring points T5 (1.5 m), T6 (1.73 m), T7 (0.5 m) and T8 (1 m) with different distances from a heating well H6 in Example 2 of the present disclosure.

It can be seen from FIG. 3 and FIG. 4 that, the temperature monitoring points with different distances from the same heating well are relatively consistent in temperature rise rate at a temperature rise stage, the heating effects achieved by temperature rise are consistent, and temperature ranges of the different temperature monitoring points are also relatively consistent after heating for 45 days, which shows the heating uniformity of the present disclosure. It can be seen from FIG. 6 that, in Comparative Example 1 without pumping of underground water, the different temperature monitoring points are obviously different in temperature rise rate, the heating effects achieved by temperature rise are different, temperature ranges of the different temperature monitoring points have great differences after heating for 45 days, the temperature near the heating well reaches 50° to 70°, whereas the temperature of an area far from the heating well is low and is still only 20° to 30°, and the soil temperature difference is great.

FIG. 5 is concentration change curves of four contaminants in underground water in Example 2. Each of figures (a) to (d) contains contaminant concentration change curves of four different positions M1, M2, M3 and M4. FIG. 7 is concentration change curves of four contaminants in underground water in Comparative Example 1. The soil remediation effect in the present disclosure is obviously higher than the remediation effect achieved by only combining heating and remediation agents without pumping of underground water.

The remediation of contaminated soil can be completed to achieve acceptance in the case that the energy consumption in the present disclosure is only about 34% of that of traditional in-situ heating remediation on the same site (traditional in-situ heating simply heats up to 100° C. and continuously extracts and removes volatile contaminant vapors in the process), and the injection amount of the remediation agents in the present disclosure is only 30% (by mass) of the dosage of remediation agents in in-situ chemical oxidation remediation on the same site. The present disclosure also breaks through the limitation that simple chemical injection on the same site cannot achieve compliance. Traditional in-situ chemical injection is suitable for the remediation of chlorohydrocarbon with moderate to low concentrations, such as several PPM levels in underground water. A higher concentration will form a smearing effect, and the contamination concentration will rebound again after a chemical injection reaction. The present disclosure can be carried out in the range of chlorohydrocarbon concentrations ranging from several hundred to 1000 PPM, and as shown in FIG. 5, the sum of the highest concentrations of the four contaminants in Example 2 can reach up to 600 PPM or above.

Obviously, the above examples are only instances for clear explanation, rather than limiting implementations. For those of ordinary skill in the art, other different forms of changes or variations can further be made based on the above explanation. It is not necessary and impossible to exhaustively list all implementations here. The obvious changes or variations arising from this are still within the scope of protection of the present disclosure.

The invention claimed is:

1. A method for remediating contaminated soil, an adopted system for remediating contaminated soil comprising a heating unit and a pumping/injecting device for pumping underground water in soil and injecting a remediation agent into the soil, wherein:
   the pumping/injecting device comprises a pumping/injecting pipeline, a pumping/injecting well as well as a vacuum pump and an injection pump connected with the pumping/injecting pipeline respectively;
   the pumping/injecting pipelines are arranged in multiple rows at intervals;
   the pumping/injecting pipelines comprise a first group of pumping/injecting pipelines and a second group of pumping/injecting pipelines; and
   each row of pumping/injecting pipeline in the first group of pumping/injecting pipelines and the second group of pumping/injecting pipelines is arranged alternately;
   the method for remediating contaminated soil comprising the following treatments:
   heating soil to be remediated;
   pumping underground water;
   injecting a remediation agent; and
   after heating for 3 to 5 days, performing at least one pre-pumping treatment on underground water every day while heating;
   wherein:
   the treatment of pumping the underground water and the treatment of injecting the remediation agent are performed after an average temperature of the soil to be remediated is heated to 40° C. to 60° C.;
   the treatment of pumping the underground water and the treatment of injecting the remediation agent are performed at a heat preservation condition of 40° C. to 60° C.;
   an organic contaminant is chlorohydrocarbon;
   the remediation agent comprises a reduction agent and an oxidation agent;
   the reduction agent is injected first, and then the oxidation agent is injected;
   the treatment of pumping the underground water and the treatment of injecting the remediation agent comprise the following steps:
   (1) starting the first group of pumping/injecting pipelines to pump the underground water, shutting down the first group of pumping/injecting pipelines after an amount of pumped water is reduced to 50% to 70% of a peak value at the beginning of pumping to stop pumping of the underground water; and using the second group of pumping/injecting pipelines to inject part of the reduction agent, an injection pressure of the reduction agent being 0.1 MPa, and a PH value being adjusted to 12;
   (2) repeating step (1) 1 to 3 times a day for 5 to 7 days with the PH value stabilized at 12, and then continuing reaction for 2 to 5 days without pumping and injection of the agent during the reaction;
   (3) starting the second group of pumping/injecting pipelines to pump the underground water, shutting down the second group of pumping/injecting pipelines after an amount of pumped water is reduced to 50% to 70% of a peak value at the beginning of pumping to stop pumping of the underground water; and using the first group of pumping/injecting pipelines to inject part of the reduction agent, an injection pressure of the reduction agent being 0.1 MPa;
   (4) repeating step (3) 1 to 3 times a day for 5 to 7 days with the PH value stabilized at 12, and then continuing reaction for 2 to 5 days without pumping and injection of the agent during the reaction;
   (5) starting the first group of pumping/injecting pipelines to pump the underground water, shutting down the first group of pumping/injecting pipelines after an amount of pumped water is reduced to 50% to 70% of a peak value at the beginning of pumping to stop pumping of the underground water; and using the second group of pumping/injecting pipelines to inject part of the oxidation agent, an injection pressure of the oxidation agent being 0.1 MPa;
   (6) repeating above step (5) 1 to 3 times a day for 7 to 10 days;
   (7) starting the second group of pumping/injecting pipelines to pump the underground water, shutting down the second group of pumping/injecting pipelines after an amount of pumped water is reduced to 50% to 70% of a peak value at the beginning of pumping to stop pumping of the underground water; and using the first group of pumping/injecting pipelines to inject part of the oxidation agent, an injection pressure of the oxidation agent being 0.1 MPa;

(8) repeating step (7) 1 to 3 times a day for 7 to 10 days; and (9) performing steps (1) to (4) and steps (5) to (8) alternately until the contaminant in the soil is lowered to a value below a target value, thus finishing soil remediation;

the agent continues to be injected for 5 to 30 days after a concentration of the contaminant in the soil is lowered to the value below the target value; and a total application amount of the oxidation agent is 0.5% to 2% of the mass of the soil to be remediated.

2. The method for remediating contaminated soil according to claim 1, wherein at least one of the following (1) to (2) is met:

(1) a plurality of heating units are provided; and (2) each row of pumping/injecting pipeline is provided with a plurality of pumping/injecting wells at intervals.

3. The method for remediating contaminated soil according to claim 2, wherein the plurality of heating units are arranged in the soil to be remediated at intervals according to a triangle method.

4. The method for remediating contaminated soil according to claim 3, wherein the reduction agent is selected from at least one of a sodium hydroxide solution and vegetable oil.

5. The method for remediating contaminated soil according to claim 3, wherein the oxidation agent is selected from at least one of hydrogen peroxide, persulfate and potassium permanganate.

6. The method for remediating contaminated soil according to claim 2, wherein the plurality of pumping/injecting wells are distributed according to a triangle method.

7. The method for remediating contaminated soil according to claim 6, wherein the reduction agent is selected from at least one of a sodium hydroxide solution and vegetable oil.

8. The method for remediating contaminated soil according to claim 6, wherein the oxidation agent is selected from at least one of hydrogen peroxide, persulfate and potassium permanganate.

9. The method for remediating contaminated soil according to claim 2, wherein the reduction agent is selected from at least one of a sodium hydroxide solution and vegetable oil.

10. The method for remediating contaminated soil according to claim 2, wherein the oxidation agent is selected from at least one of hydrogen peroxide, persulfate and potassium permanganate.

11. The method for remediating contaminated soil according to claim 1, wherein the reduction agent is selected from at least one of a sodium hydroxide solution and vegetable oil.

12. The method for remediating contaminated soil according to claim 1, wherein the oxidation agent is selected from at least one of hydrogen peroxide, persulfate and potassium permanganate.

* * * * *